April 26, 1966 F. B. DOYLE 3,247,865
REGULATOR VALVE ASSEMBLY
Filed Feb. 12, 1964 4 Sheets-Sheet 1

Inventor
Frank B. Doyle
By George E. Frost - Keith J. Kulie
Attorneys

Inventor
Frank B. Doyle
By George E. Frost - Keith J. Kulie
Attorneys

April 26, 1966     F. B. DOYLE     3,247,865

REGULATOR VALVE ASSEMBLY

Filed Feb. 12, 1964     4 Sheets-Sheet 3

Inventor
Frank B. Doyle
By George E. Frost–Keith J. Kulie
Attorneys

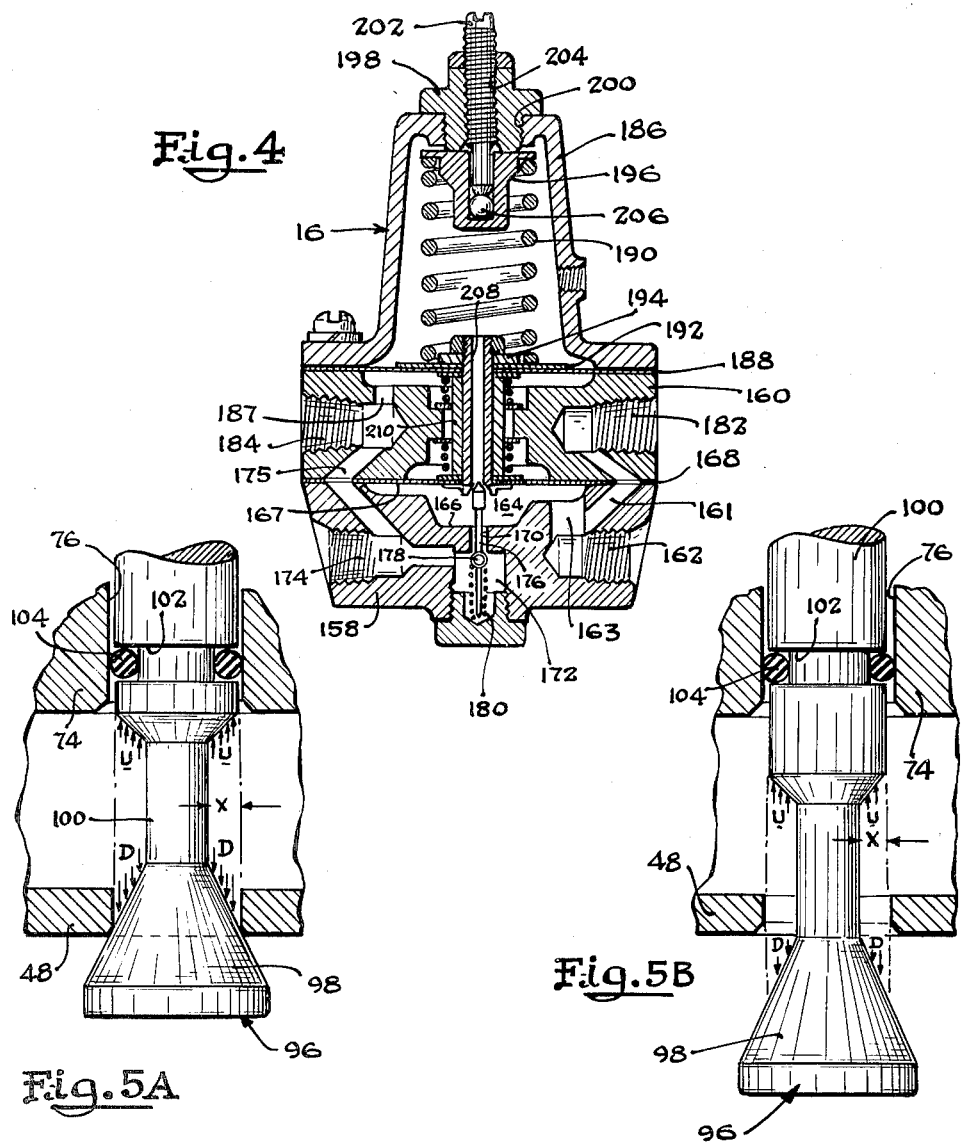

United States Patent Office 3,247,865
Patented Apr. 26, 1966

3,247,865
REGULATOR VALVE ASSEMBLY
Frank B. Doyle, P.O. Box 237, Raymond, Ill.
Filed Feb. 12, 1964, Ser. No. 344,492
4 Claims. (Cl. 137—484.8)

The present invention relates to an improved valve assembly and more particularly it relates to a regulator valve assembly for regulating flow in accord with varying demand requirements.

Various gases and liquids are transported along pipe lines that extend from gas fields in Texas and Louisiana, for example, up to the extreme northern reaches of the United States in latitudes where the outside temperature may be relatively low for intervals that may be rather extensive. Other installations include transmission lines that extend into the northernmost reaches of various continents or into the extreme southern latitudes, both areas of which may be very cold.

It is necessary to regulate the flow of gas at various distributing points along the transmission lines both to provide gas to the user at the proper pressure level and to determine for billing purposes the volume of gas used. For economic and for operating reasons, it is essential that the design of a given valve assembly for regulating and flow be as simple as possible, and to this extent elaborate control devices may not be advisable, especially in the colder climates where freezing may occur. Regulating and control valves of the type employing a double seating inner valve construction, for example, have been employed and are successfully used in warm climates. In cold climates, however, the use of this type of valve is somewhat limited in that one valve member is always disposed in the cold down stream gas due to expansion over the upper valve and the sensible heat loss accruing through said expansion. This gives rise to a condition where the valve may freeze-up in use. To combat the freezing problem, some installations burn a part of the gas to keep the regulator warm.

Another consideration of regulator valve assemblies resides in the provision of a valve that will give smooth regulatory control for accurate measurement of the volume of gas or liquid used for billing purposes.

The present invention is directed to the provision of an improved regulating valve assembly that will not freeze up in use and that will provide smooth regulatory response under varying load conditions. The valve disclosed herein is of the type having a single valve closure member to avoid freeze-up of the closure element, the positioning of the closure element being directed by a diaphragm valve operator with pressure feedback in response to load changes on the system and with a compensator or relay to minimize control action droop and irregular or choppy response. The colder expanded gases are isolated from the warm incoming gases in the present valve construction to minimize the probability of valve freeze-up.

It accordingly, is a primary object of the present invention to provide an improved valve assembly.

Another object of the present invention resides in the provision of an improved non-freezing valve assembly that does not require the application of external heat to avoid freezing of the valve members.

A further object of the present invention resides in the provision of an improved valve assembly having a diaphragm valve operator and auxiliary assembly adapted to provide a smooth response to demand changes and to maintain a predetermined desired flow rate.

Still another object of the present invention resides in the provision of a non-freezing regulating valve having a single closure member.

An additional object of the present invention resides in the provision of an improved valve assembly wherein the warmer incoming gases are isolated from the colder downstream gases and that provides reproducible, smooth control response.

A further object of the present invention resides in the provision of an improved valve assembly that is economical to manufacture and use, and that is durable in use while providing a non-freezing characteristic and smooth control response.

The novel features which are believed to be characteristic of my invention are set forth in the appended claims. The invention itself, however, together with additional objects and advantages thereof may best be understood by reference to the following detailed description taken in connection with the drawings, in which:

FIGURE 4 is a cross-sectional view of the auxiliary relay for the valve assembly;

FIGURE 5A is an enlarged fragmentary view of the valve closure member in valve closed position; and FIGURE 5B is an enlarged fragmentary view of the valve closure member in open position.

Figure 1:
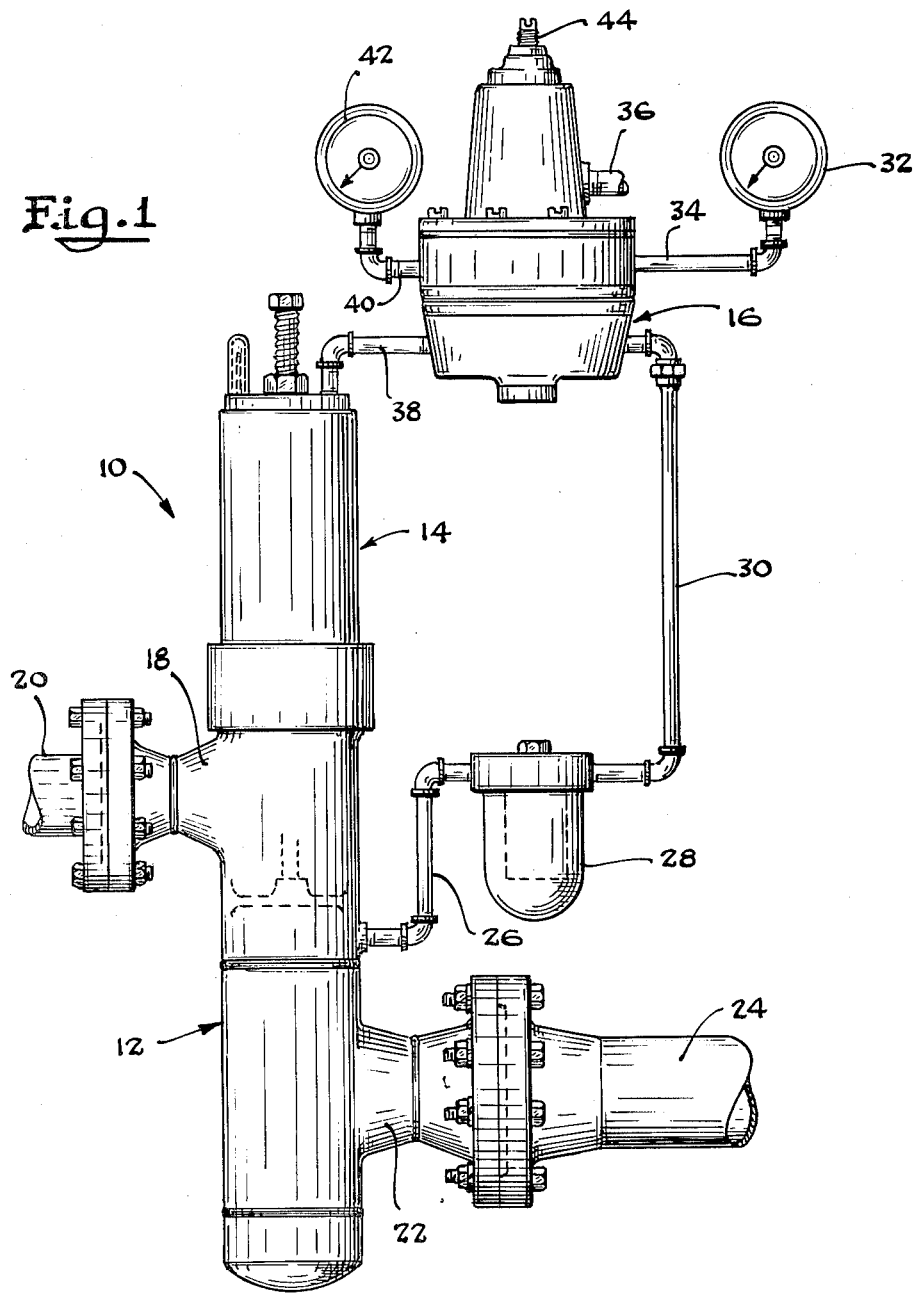
FIGURE 1 is a side elevation of the valve assembly of the present invention, illustrating the valve member and control assembly therefor.

Referring more particularly now to FIGURE 1, the valve assembly of the present invention is indicated generally at 10. The assembly 10 includes a valve 12, valve operator 14 and relay 16. The valve 12 includes an inlet port 18 connected in fluid-tight relation to conduit 20 extending from the transmission line (not shown) and an outlet port 22, connected to conduit 24.

The relay 16 of the assembly 10 is connected to the valve outlet 22 through pipe 26, filter 28 and pipe 30. The filter 28 is adapted to remove from the fluid or gas materials which might be injurious to or otherwise impair the action of the relay 16. The input pressure to the relay 16, which corresponds to the pressure in the outlet 22, is visibly displayed on a pressure gauge 32, which gauge is connected to the input side of the relay 16 through pipe 34. It should be observed that the pipe 34 may extend to a remote station for connection to a suitable readout device at some other position.

A conduit 36 extends from the relay 16 and is connected to a pressure relief vent to protect the assembly and to vent pressure from the relay chamber (defined hereinbelow) when the central valve member of the relay opens the port extending through the relay diaphragm, as defined below.

The output pressure signal of the relay 16 is connected through pipe 38 to the valve operator 14 to impose an auxiliary force action upon said operator to smooth out the control action and compensate for droop of the assembly during operation due to the spring characteristics of the diaphragm operator as described in detail hereinbelow. The outlet pressure of the relay 16 is fed through pipe 40 to a gauge 42 for continuous registration thereon.

Figure 2:
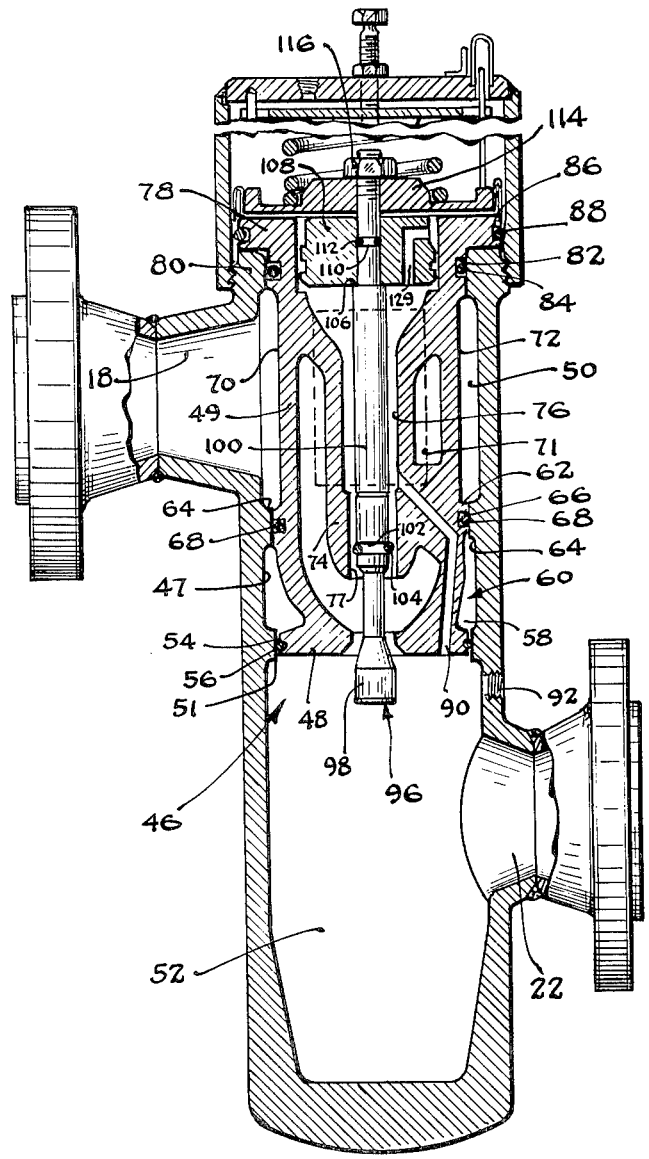
FIGURE 2 is an enlarged fragmentary side elevation, partly in section, showing in particular details of the valve structure.

The valve construction, as seen in greater detail in FIGURE 2, includes inlet 18, outlet 22, and the central valve chamber 46. The central chamber 46 is divided into two parts by seat member 48. One chamber part 50 is disposed on the inlet side of the chamber (the high pressure side) and the other part 52 is disposed on the outlet side of the chamber (the low pressure side). The low pressure side or outlet portion 52 of the central chamber defines an open expansion chamber for the gas.

An integrally formed cage 49 and valve seat member 48 is mounted within the central chamber 46, as illustrated. The cage 49 is telescopically received within the inlet portion 50 of the chamber 46. As indicated, the chamber 46 is provided with an annular boss 51 at the base thereof. When the integral seat and cage member is inserted within the chamber 46 the seat portion 48 thereof is in registration with boss 51. The outer periphery of the seat 48 is provided with an annular recess 54 within which an O-ring 56 is received. The O-ring 56 is adapted to provide a fluid or gas-tight seal at the interface between the seat 48 and the boss 51 of the chamber 46. The cage 49 extends inwardly at 58 adjacent the seat 48 to define an open annular space 60 between the inwardly sloping portion 58 of the cage 49 and the inner wall portion 47 of the chamber 46. The cage 49 is provided with a boss 62 which, when the cage is in assembled relation in the valve body, is in registration with a boss 64 on the chamber wall. The boss 62 is provided with an annular recess 66 within which is disposed an O-ring 68. The O-ring 68 defines a fluid or gas tight seal at the interface between the bosses 62 and 64, respectively. Thus, the O-ring seal 56 defines the lower limit of the sealed space 60 and the O-ring seal 68 defines the upper limit of the sealed space 60. No fluid or gas enters or leaves the space 60 and said space therefore acts as an insulating barrier for the valve sealing area defined by the valve seat 48 and closure member, as defined below. This insulating barrier 60 isolates the relatively cold expanded gases in the area 52 of the valve from the warmer incoming gases in area 50.

The cage 49 defines a hollow ribbed structure having openings 70, 71 and 72, for example, extending through the wall thereof into the open central portion of said cage. A centrally disposed stem guide member 74 is integrally formed in the cage 49 to provide guide means for the stem of the valve closure member. As illustrated in FIGURE 2, the member 74 defines an opening 76 centrally thereof, to receive the valve stem 100 of valve 96.

A flange 78 is provided at the upper terminal of the cage 49, said flange being adapted to rest upon the upper terminal 80 of the valve body when assembled therein. The flange 78 positions the cage 49 within the chamber 46 of the valve member 12 to orient the seat and cage members, as noted hereinabove. The cage 49 is provided with an annular recess 82 just below the flange 78. An O-ring 84 is received within recess 82 and defines a gas-tight seal at the interface between the upper portion of the cage 49 and the upper terminal 80 of the valve body. This seal 84 prevents leakage of gas to the valve operator along the cage-valve body interface. The flange 78 is provided with an annular recess 86 within which is received a diaphragm retaining ring 88.

A conduit 90 extends from the valve outlet area 52, through a rib of the cage 49 and into the central opening 76 of said cage member. This provides means for equalization of pressure between the valve outlet area and the central opening 76, the only pressure differential existing being dependent upon the pressure transfer rates due to the restricted nature of the conduit 90. This rate can be regulated by control of the opening size. It should be observed that the same function may be achieved by having the conduit 90 extend through the valve stem 100 from area 52 to central opening 76. Also the conduit 90 may be in the form of an external pipe extending from area 52 to opening 76. An opening 92 is provided in the wall of the valve body and extends into the valve outlet area 52. The pipe 26 is connected to opening 92 and connects the relay 16 to the outlet area 52 of the valve.

The valve closure member, indicated generally at 96, includes disc 98 and a stem 100. The disc 98 is adapted to move into gas-tight sealing relation with the valve seat 48 when in closed position and to move to a point spaced from said seat 48 when the valve is in open position (open position of the valve being illustrated in FIGURE 2). The stem of the closure member is provided with an annular recess 102. An O-ring 104 is received within the recss 102 and is adapted to provide a gas-tight seal at the interface between the stem 100 and the cylindrical wall of the bore 77 of guide member 74. The stem 100 is provided with a shoulder 106 in the upper portion thereof. A lower diaphragm mounting plate 108 is supported vertically on the stem shaft 100 by the shoulder 106. A recess 110 is provided in the stem 100 adjacent the upper extremity thereof within which an O-ring 112 is received to provide a gas-tight seal between the stem 100 and the lower diaphragm mounting plate 108 of the assembly. The upper terminal of the stem 100 is threaded, as indicated in FIGURE 2. The upper diaphragm mounting plate 114 is received over the upper terminal of the stem and is affixed thereto by threading the retaining nut 116 along the threaded portion of the upper terminal of stem 100 until it is brought into snug relation with the upper mounting plate 114.

Figure 3:
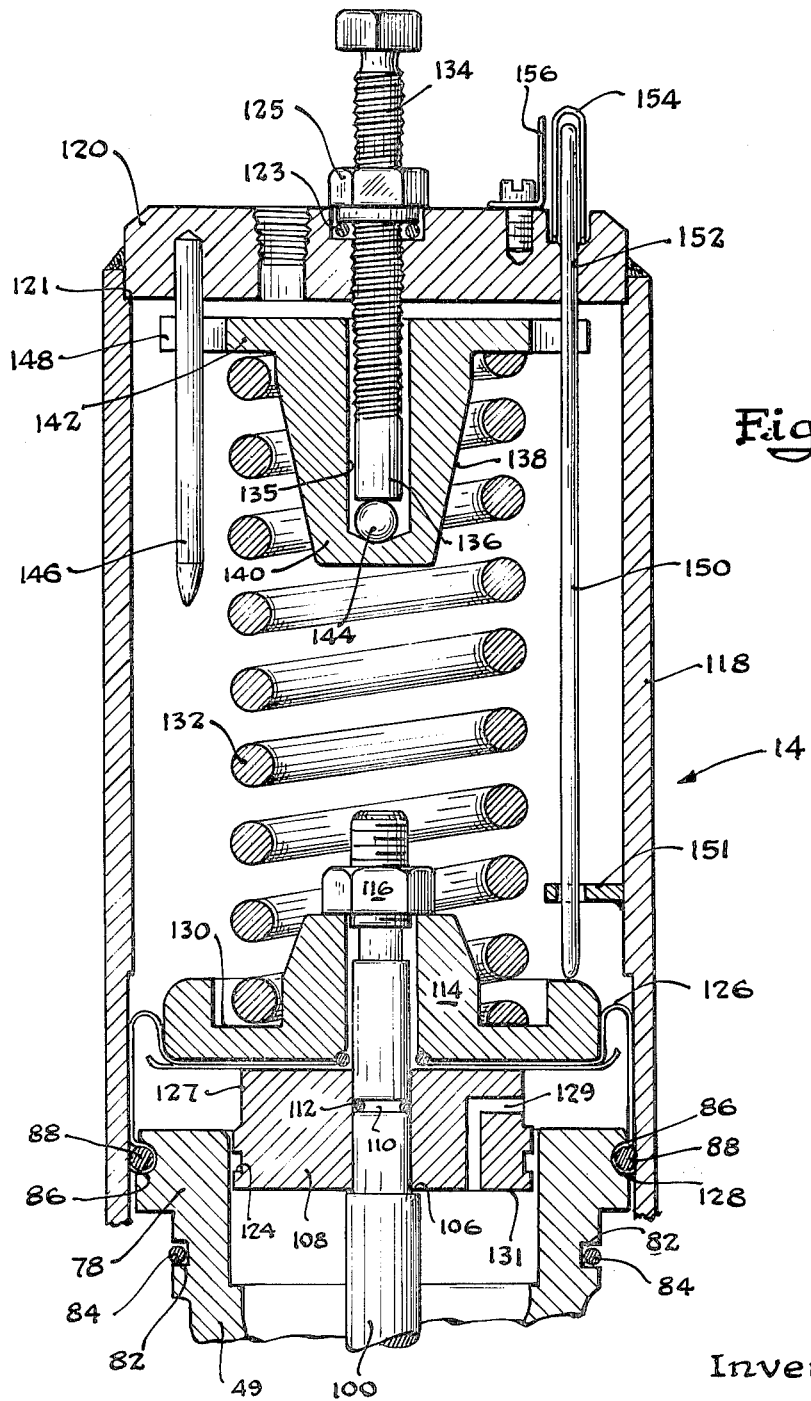
FIGURE 3 is an enlarged fragmentary sectioned view of the diaphragm operator for the valve.

The valve operator construction may be more clearly understood by reference to the enlarged, fragmentary, sectioned view of FIGURE 3. As seen in FIGURE 3, an outer cylindrical casing 118 is provided to protect the valve operator 14. A cap member 120 is mounted on a shoulder 121 at the upper terminal of the casing 118 and may be welded thereto for leak-proof assembly when the operator is fully assembled and mounted to the valve body.

A roll-type diaphragm assembly is provided of the type wherein the same effective diaphragm area is retained for all operating positions of the valve operator. This provides substantially linear control characteristics for positioning of the closure member as distinguished from the variable area diaphragm operators frequently employed. The circumferential outer terminal of the diaphragm 126 is rigidly affixed to the cage 49 by means of the retaining ring 88 of the assembly. It should be noted that the ring 88 is mounted within recess 86, as noted above, with the periphery 128 of the diaphragm 126 rolled thereabout and trapped thereby. A gas-tight seal is defined between the diaphragm 126, casing 118 and the cage 49.

The diaphragm 126 is mounted centrally between a lower diaphragm mounting plate 108 and an upper diaphragm mounting plate 114 with a gas-tight seal defined therebetween. The diaphragm mounting assembly is rigidly vertically positioned along the stem 100 between the shoulder 106 thereon and the nut 116 which is threaded down against the upper mounting plate 114. The upper mounting plate 114 defines a spring receiving base 130 on the upper face thereof. A spring member 132 is mounted in the valve operator and rests at the bottom on the base 130 of the plate 114.

The cap 120, noted above, is provided with a threaded opening 121 within which is received a threaded adjusting nut 134. The lower terminal 136 of the adjusting nut 134 extends into a recess 135 in a compression member 138 of the valve opeartor. The compression member 138 is defined by the projection 140 within which the recess 135 is defined and a collar 142 to receive the upper terminal of the spring 132. The lower terminal of the adjusting nut 134 rests upon a bearing member 144 to facilitate easy rotating movement for the nut 134 in adjustment thereof to vary the spring rate in accord with a predetermined desired level. The adjusting nut 134 is sealed at the cap 120 by an O-ring 123 which is trapped between a locking nut 125 and the cap 120.

A pin 146 extends downwardly from the cap 120 into a recess 148 in the collar 142 of the compression member 138. The pin 146 is intended to prevent rotative movement of the member 138 during operation of the valve or adjustment of the spring rate through rotation of the nut 134.

A position indicator rod 150 is disposed within the cylindrical casing member 118. The indicator rod contacts the upper surface of the upper plate 114 and moves up and down in accord with movement of said plate. A guide member 151, rigidly fixed to casing 118 guidingly positons the lower portion of the indicator rod 150. The upper portion of indicator rod 150 extends through an opening 152 in the cap 120 and into an optically transparent shield 154. As indicator plate 156 is affixed to the cap 120 in proximity to and in registration with the shield 154. The plate 156 may have position readings such as "open," "closed," or the like, provided thereon for ease in determination of the position of the valve closure member as represented by the position of the rod 150 with respect to the plate 156.

The lower diaphragm support member 108 of the valve operator 14 is provided with an annular groove 124 adjacent the lower terminal thereof. A suitable lubricant may be disposed in groove 124 to serve as a reservoir for lubrication of the interface between member 108 and the valve cage 49 as the member 108 moves therein. The upper outer periphery of the member 108 is recessed as at 127 to provide for free flow of gas thereabout. A channel 129 extends from the bottom face 131 of the member 108 to the recessed portion 127 thereof. It can be seen that any pressure change in the central opening 76 is readily impressed upon the lower face of the diaphragm 126 due to direct pressure connection through the channel 129.

The relay 16 is illustrated in greater detail in FIGURE 4 of the drawings. The relay 16 includes bottom and center members, 158 and 160, respectively. The bottom member 158 is provided with a threaded port 162 to which the pipe 38 is affixed to transmit the auxiliary variable control pressure from relay 16 to the valve operator 14. The port 162 communicates through channel 163 with chamber 164, which chamber is defined along one side by a wall 166 in chamber 164 and on the other side by a diaphragm 168. The diaphragm 168 also defines the separation between the bottom member 158 and center member 160 and provides a gas-tight seal therebetween. Conduit 170 extends from chamber 164 to chamber 172 and then to port 174. Pipe 30 is connected to the port 174 of the relay to provide communication between the relay and valve outlet port 22.

A valve member 176 is provided with a first valve seal 178 adapted to control the flow of gas through conduit 170. A spring 180 is telescopically received about the stem of the valve member 176 and is adapted to bias the valve 176 to a position where the valve seat 178 thereof will seal off gas flow through the conduit 170.

The center member 160 of the relay 16 is provided with oppositely disposed ports 182 and 184. A pipe 40 is connected to port 182 and transmits pressure from said port to a pressure gauge 42. Pressure gauge 42 is included to provide a visual indication of the transient pressure level in the valve operator chamber. Port 182 is connected to the port 162 by a channel 161 which channel extends through the diaphragm 168. Port 184 is connected to the outlet port 174 by a channel 175 which extends through the diaphragm 168. Pipe 34 is connected to port 184 and transmits the relay inlet pressure to gauge 32 for continuous visual indication of the transient pressure level of the relay inlet pressure.

A top casing 186 is sealingly affixed to the top face of the center member 160 of the relay 16. The diaphragm 188 is mounted between the member 160 and casing 186 and defines a gas-tight seal therebetween. A spring 190 is mounted within casing 186. The bottom of spring 190 is supported on disc 192 and is positioned thereon by a guide ring 194. The upper terminal of the spring 190 is mounted on spring compression member 196. A cap 198 is threadably received in a threaded opening 200 in the top casing 186. The cap 198 receives an adjusting nut 202 which may be threaded into and out of opening 204 in cap 198. Nut 202 acts on bearing 206 to move the member 196 against the spring 190 to vary the compression of said spring. Port 36 extends through the wall of casing 186 and is connected to an external vent to exhaust pressure from the chamber defined by the top casing 186.

A diaphragm rod 208 is sealingly connected to each of the diaphragms 168 and 188 of the relay 16. The rod 208 opens at one end into the chamber defined by the casing 186 and at the other end into chamber 164 of the relay. A spacer sleeve 210 is provided between the diaphragm 168 and 188 and is telescopically received about the rod 208, said sleeve defining means to move the diaphragm in unison during operation of the device.

The primary valve operator 14 of the regulator valve assembly is adjusted initially to maintain a predetermined pressure level in the valve outlet 22. For example, the regulatory assembly may be adjusted to maintain a pressure in the valve outlet 22 of about 50 p.s.i.g. (outlet pressure can range from about 10 to 75 p.s.i.g.), the pressure drop from transmission line inlet pressure (for example, 700 p.s.i.g., with a range of 350 to 1000 p.s.i.g.) to the 50 p.s.i.g. in the valve outlet 22 being taken across the valve closure assembly. If the effective area of the diaphragm 126 of the valve operator 14 is about 12 inches then the upward force acting upon the valve closure member is equal to the pressure in the valve outlet (50 p.s.i.g.) times the number of square inches of diaphragm area, the total pressure being 600 pounds in this example. To obtain a slight opening of the valve closure member 96 the adjusting nut 134 is threaded down to compress the spring 132 and force said spring against the upper diaphragm support plate 114 thereby causing the spring to act upon the diaphragm. The adjusting nut 134, in our example, is turned down until the spring acts upon the diaphragm with 600 pounds of force. The valve operator now is in full balance as long as the 50 p.s.i.g. pressure level is maintained in the valve outlet 22. It should be observed that the demand is constantly changing due to varying consumption of gas by the numerous users, said consumption varying in rate and time. To this extent the pressure in the valve outlet 22 is always varying by at least a slight amount.

It was discovered that with the use of the valve operator noted above, and without the relay 16, control action was irregular, that is "choppy," and the lack of smooth control action gives rise to difficulty in accurately measuring the rate of consumption of gas.

If a pressure drop to 49 p.s.i.g. occurs in the valve outlet due to consumption of gas on the line, then the force acting on the underside of the diaphragm 126 is 49 times the area (12 square inches), or 588 pounds. The spring 132 will, of course, always seek a position where it is in equilibrium with the opposing force. In the example, the spring was exerting 600 pounds against an equivalent opposing force. The opposing force has dropped to 588 pounds so the spring will extend itself until it is exerting 588 pounds of force in opposition to the force on the underside of the diaphragm. As the spring extends itself, the diaphragm 126, valve stem 100 and valve closure member 96 move down. This is the desired action since there has been an increase in demand and the valve then must open wider to supply more gas so that all users will have a sufficient quantity of gas at the desired pressure level.

In addition to the pressure unbalance existing in the assembly due to constant variation in use of the gas, and thus constant variation in the pressure level at valve outlet 22, there is a variation due to unbalanced pressure loads upon the valve closure member. If, for example, it is assumed that the pressure in valve inlet 18 is 700 p.s.i.g. and that the valve disc 98 is fully seated in the port defined in seat member 48 thereby to fully obstruct the flow of gas therethrough, then the inlet pressure (700 p.s.i.g.) acting upon the valve stem 100 is in balance with the pressure acting down on the disc 98 to provide full balance for this portion of the assembly. The area upon which the pressure forces act is represented by the annular ring X, FIGURES 5A and 5B. The upward pressure force acts in the direction of the arrows U, as seen in FIGURE 5A and the downward pressure force acts in the direction of the arrows D, FIGURE 5A, against the upper sloping face of the disc 98. A static balance is defined with the disc 98 in closed position. However, when the valve closure member 96 is opened, as indicated in FIGURE 5B the pressure force acting upward on the member 96 remains at about 700 p.s.i.g. over the annular area X, while the downward force is considerably reduced resulting in a pressure unbalance (dynamic unbalanced force) tending to urge the closure member toward valve closed position. The pressure acting downward upon the disc 98 is a function of the inlet pressure as it moves thereacross, a force somewhat lower than the inlet pressure. In the example, and on actual test, it has been determined that the pressure resulting from flow of gas across the disc 98 is equal to the absolute pressure in the valve inlet 18 multiplied by 53%. In this example the pressure acting down on disc 98 would be 700 plus 14.7 (atmospheric pressure) times 53%, or 378 p.s.i.a., which is equivalent to 363.3 p.s.i. Thus, the unbalanced force acting upward on the closure member 96 then is equal to 700 less 363.3 or 336.7 pounds per square inch. The annulus of one valve in service in full open condition is about 0.10 square inch. The unbalanced force acting upward on this valve under the above noted conditions would be one-tenth of 336.7 per square inch, or 33.67 pounds. This dynamic unbalance cannot totally and effectively be compensated for by the spring since movement of the valve closure member requires alteration of the spring force for a given flow rate and movement of the valve closure member, of course, alters the flow rate itself which moves the closure member to a position not dictated by the demand upon the system. The compensating force for the dynamic unbalance must be obtained by a corresponding increase in force upon the upper face of the diaphragm. The dynamic unbalance tends to move the closure member up with a force of 33.67 pounds (under the conditions set forth).

A deviation from exact proportional control is realized, therefore, due to the spring characteristics in that it takes a certain amount of force just to deflect the spring from its relaxed position to a compressed condition and this force is independent fo the change in flow rate so that exact proportional response of the operator may not be expected. This characteristic is called "droop" in control action and is compensated for by an external independent force, such as a modifying cam action, or the like. A further deviation from accurate proportional control results from the dynamic unbalanced forces acting upon the valve closure member 96.

The irregular control response with a regulator of the type set forth herein is realized in use in the following manner. When the demand on the system is increased, for example, the closure member 96 moves to a position in greater spaced relation to the valve seat 48 to permit an increase in the total flow of gas to meet consumption. This valve closure opening action is brought about by a decrease in pressure in valve outlet 22. The spring of the operator then pushes the diaphragm down and the closure member is moved down in unison with it. The spring must, however, compensate for the dynamic unbalance acting upon the closure member and thus is required to exert a force in excess of that required simply to comply with increased demand. As noted above, demand is always changing in these systems and thus when the demand drops a short time after the increase the closure member 96 moves toward the seat to adjust the flow rate in accord with the reduced demand. The downstream pressure, however, upon reduction in demand must increase more than the amount required to compress the spring in accord with the change in demand due to the previously applied compensating forces for the forces on the closure member. After a short interval the valve operator "equalizes" and assumes a position proportional to the increase or decrease in the flow rate but not until there is a period of over-compensation for the unbalanced forces acting upon the system. This equalization occurs in a choppy action tending to impart irregular movement to the closure member and the pressures in the system. The pressure measuring devices respond to the irregular response of the system by measurement in an irregular manner giving rise to difficulties in accurate measurement of the consumption of gas from the system.

The booster reversing relay 16 functions in the following manner. The port 162 is connected through pipe 38 to the interior of the valve operator assembly 14 to transmit a base pressure and transient control pressure thereto. Port 174 is connected through pipe 30 to the valve outlet 22 to transmit the pressure in said outlet to the interior of the booster reversing relay 16. A pipe 40 is connected to the port 182 to transmit the pressure in said port to a gauge 42. A pipe 34 is connected to port 184 to transmit the pressure, corresponding to the pressure level in the valve outlet 22, in the port to the gauge 32. The relay is adjusted during initiation of the regulating action to impress a control pressure of 3 p.s.i.g. to the operator chamber in operator assembly 14. To follow our previous specific example, when a pressure drop of 1 p.s.i.g. occurs in valve outlet 22, this pressure drop will also occur in pipe 30 and will cause a corresponding 1 p.s.i.g. pressure drop in the port area 174. The port 174 is connected through conduit 175 and conduit 187 to the area below the upper diaphragm 188. The 1 p.s.i.g. pressure drop in valve outlet 22 therefore will cause the diaphragm 188 to move down under the control action of the spring 190. As noted above, the diaphragm disc 167 adjusts the effective area of the diaphragm 168 so that the ratio between the effective area of diaphragm 188 and 168 is 5:1. Diaphragms 188 and 168 move down in unison upon a reduction in pressure in valve outlet 22 to move the valve disk 178 away from its seat and to permit gas to move, under pressure, from chamber 172 to chamber 164 of the relay 16. With a 5:1 ratio in effective areas of the diaphragm, the diaphragms 168 and 188 will not move back up sufficiently to fully seat valve disc 178 against its seat until the pressure in chamber 164 has increased 5 p.s.i.g. (in accord with the 1 p.s.i.g. pressure drop in chamber 172). The booster relay 16 acts to increase the pressure over the diaphragm 126 when the pressure in valve outlet 22 drops. In our previous example, when the pressure in valve outlet 22 dropped from 50 p.s.i.g. to 49 p.s.i.g., the force (in pounds) acting upon the lower face of the diaphragm 126 decreases from 600 pounds to 588 pounds (effective area of the diaphragm is 12 square inches). If a booster relay 16 is provided that has a five-to-one reversing ratio, then the pressure drop of one pound in the valve outlet will cause a pressure increase of 5 pounds in the area above the diaphragm 126 to act upon the upper face of the diaphragm. The total increased force acting upon the upper face of the diaphragm will be the 5 p.s.i.g. times the effective area of the diaphragm (12 square inches), or, 60 pounds. The decrease in force below the diaphragm is 12 pounds (1 pound times 12 square inches) so that the total increase in force moving the diaphragm down is 72 pounds.

With a spring 132 made of ⅜ inch diameter wire on a pitch diameter of 2¾ inches and having 10 active turns, a reduction in pressure in the valve outlet 22 of 1 p.s.i.g. will cause the spring to extend .0807 inch without the booster reversing relay 16. A force of 39 pounds is required to move the spring 132 a distance of .0807 inch in the regulator assembly defined herein. As noted above, when the pressure in the valve outlet 22 drops 1 p.s.i.g., the total unbalanced force acting down on the diaphragm 126 is 72 pounds. If 39 pounds are required to move the spring .807 inch to adjust the control member 96 to the new position required for adjustment of the flow rate through the valve, then the remainder, or 33 pounds of force, is available to offset the dynamic unbalance (about 33.67 pounds) of the valve assembly, as illustrated herein, so that the completed assembly will be in balance. Therefore, adjustment of the valve control member to correspond to increases or decreases in demand will not result in temporary over-corrections of the assembly and the irregular control response will be avoided.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What I claim as new and desire to secure by Letters Patent of the United States is:

1. An improved regulator valve assembly comprising, in combination: a valve member having an inlet, an outlet and a central valve chamber, said central chamber defining a valve seat; a valve closure member disposed in said central chamber to control flow through said valve member by movement in said central chamber toward and away from the valve seat, said valve closure member including a valve stem said closure member being constructed so that the pressure forces acting upon it when in closed position are balanced and having unbalanced forces acting upon it when it is away from the closed position; a diaphragm valve operator acting upon the valve stem to regulate the position of the valve closure member, said operator including a spring acting against one side of the diaphragm, said spring having adjusting means associated therewith to permit variable biasing of the diaphragm operator and thereby the closure member to maintain a predetermined regulated pressure in the valve outlet; means extending continuously from the valve outlet to the other side of the diaphragm of the valve operator whereby the pressure in the valve outlet acts upon said other side in feedback relation to vary the position of the valve closure member in response to the transient load condition; and, relay means in pressure communication with the valve outlet to impress a pressure load upon said one side of the diaphragm which is a function of the transient pressure level in the valve outlet and which is of character and magnitude to continuously compensate for the variable dynamic forces acting on the closure to establish and maintain a balanced condition in the valve.

2. An improved regulator valve assembly having means to compensate for dynamic unbalanced forces on a valve closure member, comprising in combination:

a valve member having inlet, outlet and central valve chambers and a valve seat, with the valve closure member mounted in said central chamber to control flow through said valve member by movement toward and away from the valve seat, said closure member being constructed so that the pressure forces acting upon it when in closed position are balanced, said closure member having unbalanced forces acting upon it when away from said closed position, said closure member including a valve stem;

a pressure responsive diaphragm valve operator acting upon the valve stem and including adjustable loading means acting against one side of the diaphragm;

an open channel extending from the valve outlet to the other side of said diaphragm whereby the pressure in the valve outlet acts upon the other side of the diaphragm to vary the position of the valve closure member in response to the transient pressure level in the outlet; and, relay means connected to the valve outlet and to the operator to impress a pressure load upon said one side of the diaphragm which is a function of the transient pressure level in the outlet, the pressure load from said relay being of magnitude to compensate for the variable unbalanced forces on the closure member when it is away from the closed position.

3. An improved regulator valve assembly having means to compensate for dynamic unbalanced forces on a valve closure member, comprising in combination:

a valve member having inlet, outlet and central valve chambers and a valve seat, with the valve closure member mounted in said central chamber to control flow through said valve member by movement toward and away from the valve seat, said closure member being constructed so that the pressure forces acting upon it when in closed position are balanced, said closure member having unbalanced forces acting upon it when away from said closed position;

a pressure responsive diaphragm valve operator acting upon the closure member and including adjustable loading means acting against one side of the diaphragm;

means extending from the valve outlet to the other side of the diaphragm of the valve operator whereby the pressure in the valve outlet acts upon the other side of the diaphragm to vary the position of the closure member in response to the transient pressure level in the outlet; and, relay means connected to the valve outlet and to the operator to impress a pressure load upon said one side of the diaphragm which pressure load compensates for variable loading of the diaphragm due to dynamic unbalanced forces on the closure member during valve open position.

4. A pressure regulator valve assembly having means to avoid characteristic hunting action of the valve closure member due to dynamic unbalanced forces thereon during transition from one flow level to another to provide stable control during static and dynamic valve operating conditions, said assembly comprising:

a valve member having inlet, outlet and central valve chambers and a valve seat, the valve closure member movably mounted in said central chamber to control flow through said valve by movement toward and away from said seat, said closure member including a valve stem, the closure member being constructed so that the pressures forces acting upon it when in closed position are balanced and having unbalanced forces acting upon it when it is away from closed position;

a pressure responsive diaphragm valve operator acting upon the valve stem to regulate the position of the closure member and having adjustable loading means acting against one side of the diaphragm, the other side of the diaphragm being in pressure connection with the valve outlet chamber; and, control means in pressure connection with the valve outlet chamber and said one side of the diaphragm and imposing a force on said one side of the diaphragm which force is a function of the variation in pressure in the valve outlet from a predetermined pressure level and of variable magnitude to compensate for the variable dynamic unbalanced forces acting on the valve closure member to balance the forces on the stem at any flow level.

References Cited by the Examiner

UNITED STATES PATENTS

| | | | |
|---|---|---|---|
| 2,690,760 | 10/1954 | Hughes | 137—484.2 |
| 2,879,783 | 3/1959 | Taplin | 137—116.5 |
| 3,115,068 | 12/1963 | Lofink | 137—505.18 X |

MARTIN P. SCHWADRON, *Acting Primary Examiner.*